3,186,852
PROCESS FOR MAINTAINING THE CRISPNESS IN A PASTRY PRODUCT FILLED WITH A FROZEN CONFECTION

William H. Baker, Worthington, Ohio, assignor to Big Drum, Inc., a corporation of Ohio
No Drawing. Filed Dec. 26, 1961, Ser. No. 162,209
1 Claim. (Cl. 99—136)

This invention relates to the maintaining of crispness in a pastry contacted by a frozen confection. More specifically, it deals with the preservation of crispness in a baked pastry cone after the cone is filled with low-temperature ice cream and during low temperature storage up until the time it is consumed. However, it is to be understood that although the following description refers to ice cream cones, the invention is not limited thereto.

Pastry cones, especially of the sugar rolled type, are very crisp at the time baking is completed and it is desirable that this crispness be maintained until the time when the cone with the ice cream therein is eaten.

The batter for these pastry cones has a high starch content so that the baked cone is moisture absorptive. This tendency to absorb moisture is increased by the high amounts of sugar used in the batter. The invert sugars in mixtures of this kind do not readily crystallize and probably exist in the mix as discrete globules of a highly viscous liquid. Baking of the batter usually occurs at about 375° F. and, as is well known, at temperatures above 280° F., sugars tend to dehydrate and form anhydrides which are hygroscopic. Although only a small amount of the sugar in the batter mix would be dehydrated in the baking process, because of the relatively short time of baking, the anhydride which did form, however, would be on the surface of the cone where it could be most easily attacked by water. Both the presence of the uncrystallized invert sugar and the small amount of sugar anhydride are factors which could increase water absorption by the cone.

It has been customary in the past to spray the baked cone, immediately after baking, with an oil, such as a vegetable oil, so that the cone became saturated with the oil and would, therefore, not tend to absorb moisture from the air during storage. These cones are commonly placed in protective paper cones immediately after treating with the oil, and this paper on the outer surface of the cone would further resist penetration of moisture into the pastry cone from the outside. Sometimes the sugar particles or granules on the inner surface of the cone are not completely covered but are exposed. These granules or particles, being hygroscopic, tend to absorb moisture but since the cones are usually nested for storage until used, there is little likelihood of the pastry cones absorbing moisture from the air during storage since the outer surfaces are protected by the paper cones and the inner surfaces of all of them, except the uppermost one, are not exposed to the air.

However, it has been found that at the time the pastry cones are filled with ice cream and during storage after filling, there is a tendency for them to absorb some of the free water content of the ice cream, especially after periods of cold storage of the filled cones during which the temperature variations occur. Ice cream used in filling these cones usually has a substantial free water content at about 24° F. which is about the normal temperature of the ice cream at the time of filling. The free water content is less at the lower temperatures of storage of the cones but at these low temperatures there is still considerable free water content in the ice cream. Therefore, during filling and during cold storage, there is a tendency for the unprotected or exposed sugar granules or particles, which are hygroscopic, to absorb free water from the ice cream and, therefore, make the cones less crisp or even soggy.

Ice cream is an emulsion, but may also be considered a foam containing a system of ice crystals. Ice cream mix is normally agitated during freezing so that the ice crystals that form are small. The fat, protein, and stabilizer, such as gelatin, in the mix tends to keep the crystals from growing. Small crystals, however, melt more rapidly than large ones when the temperature rises slightly. When the temperature falls the free water from the small crystals then recrystallize on the larger crystals causing the larger ones to grow. The growth of the ice crystals in the filled pastry cone would occur more at the cone surface, because the temperature variation would occur in this area, initiating crystal growth. In the filled pastry cone the ice cream is in close contact with the cone and as the crystal grows, it exerts force outwardly and ruptures the thin surface film of vegetable oil, if the surface film is still continuous at this time. The ice crystal is then in direct contact with the cone and in contact with the sugar and sugar anhydrides thereof. When this occurs, the ice crystal begins to melt because of the melting point lowering constant of the crystal in contact with a solute, and a saturated sugar solution forms in the cone matrix. This action could occur at many sites over the inner surface of the cone at the same time. Each site would then be an area for imbibing water into the cone and cause its softening or loss of crispness in the course of a few hours or several days.

Trials were made in the laboratory to verify the assumption that the water for softening the pastry cone came from the ice cream. Samples of filled cones were stored at $-10°$ F. and $0°$ F. The samples were placed in storage and at two-day intervals cones were removed, split longitudinally with a sharp knife and evaluated for crispness. The evaluations were made by distorting the cone to produce a sharp fracture. No measurements were made of the force required to break the cone but the flexibility of the cone and the type of fracture were observed closely. The cones are rolled into a conical shape when they are made and the ends are overlapped giving a double layer of cone in some areas. These two layers of the cone were separated during the evaluation to determine their respective crispness. Thirty-two days after the start of the storage test, the cones stored at $0°$ F. showed some flexibility before breaking and were leathery in texture. Cones stored at $-10°$ F. exhibited the same characteristics. After four more days, the cones were all leathery. When the outer layer of cone was separated at the point of overlapping it was found to be crisp at the end of the storage period and it broke with a sharp fracture. The inner layer of cone at this time was leathery. In several of the leathery cones where the ice cream had failed to fill a small space at the bottom, the portion of cone not in contact with the ice cream was crisp and so friable that it broke with an audible snap when squeezed in the fingers. The results of the evaluations provide sufficient evidence that when the cone softened the water migrated into the cone from the ice cream.

If the thin film of vegetable oil is present on the cone as a water barrier, it is necessary that this thin film be penetrated by some material before the water can pass at an appreciable rate from the ice cream to the cone. The growth of ice crystals provides one means of penetration; however, physical penetration may result also from the crystallization of lactose at low storage temperatures.

Ice cream mixes are homogenized to divide the fat globules which produces a smoother texture and increases the whipping properties of the mix. This homogenization also affects the function of the protein. The fat globules in milk vary from 1 to 18 microns and average around 7.5 microns in diameter. When the ice cream mix is homogenized, the size of the globules may be reduced to 0.5 micron. The surface area is therefore increased 16 to 50 times that of the same weight of fat in milk. As a consequence, there is not a sufficient amount of phospholipides and proteins to cover the surface of the fat and stabilize it. More nonfat milk solids are added to the ice cream mix for stabilization. If too much of these nonfat milk solids are added the ice cream becomes granular in storage because the added lactose is insoluble at low temperatures and crystallizes out. The usual amount of added nonfat milk solids will result in some crystallization of lactose during low temperature storage. These crystals would form first at the interface between the cone and the ice cream and could serve as another physical means of penetrating the thin water repellent vegetable fat film on the cone.

The present invention overcomes the tendency for the filled pastry cones to absorb moisture at the time they are filled with the ice cream and during periods of cold storage, even under varying temperature conditions and for long periods of time. The process of this invention is very simple yet is very effective for protecting the pastry cones so that they are maintained crisp up to the time of consumption.

According to the present invention, the pastry cones are treated immediately after baking, as before, with a primary coating. This treatment involves the application of a liquid fat into the interior of the pastry cone just before it is placed in the protective outer cone, which is usually of paper. This treatment preferably occurs with the fat at about 100° F. as the melting point of the liquid fat is considerably under this temperature. The application of the fat is preferably by spraying. However, other methods of application have been used and found feasible and include dipping and painting.

Various fats can be used in this spraying operation but vegetable oils are preferred. The fats should have a melting point ranging from about 70° F. to 80° F. They can, therefore, be sprayed effectively into the cone at temperatures ranging from 80° F. to 110° F. Various vegetable oils and mixtures thereof have been used in this primary oil coating or treating operation. Oils which have been used and have been found satisfactory are hydrogenated soybean oil, cocoanut oil, peanut oil, cottonseed oil, and corn oil.

Vegetable oil or oils sprayed on the baked pastry cone prior to its use have been successful in serving as a moisture or water barrier in the manner indicated prior to filling the cone with ice cream and, therefore, the cone is maintained crisp by this primary treatment up to the time of filling it with the ice cream. However, to protect the cone from the free water content of the ice cream which is used for filling it, further treatment is necessary.

A successful secondary treatment has been developed according to this invention which has been found in actual practice to be very effective in preventing moisture from being absorbed from the ice cream immediately after filling and for long periods of cold storage. This treatment provides a secondary coating on the primary oil coating on the cone and although the exact nature of its action cannot be determined with certainty, it apparently acts as a barrier coating between the ice cream crystals and the surface of the pastry cone. It apparently coats any exposed sugar anhydrides or particles at the surface of the pastry cone and also acts as a physical barrier to prevent penetration of ice crystals of the ice cream into the material of the cone so as to penetrate the water barrier and permit water absorption from the ice cream therein.

In general, this secondary treatment comprises the application to the pastry cone of a liquid dispersion of suitable solids in suitable fats. The fats have a melting and solidificaton or freezing point much higher than the temperature of the ice cream at the time it is used to fill the cone. At this time, the ice cream is preferably around 24° F., although its temperature may vary from about 22° F. to 25° F. The oil used is preferably the same oil as used in the primary treatment but the two oils should be mutually soluble so that the secondary coating will tend to adhere to the primary coating. The oil used in the secondary coating preferably has a melting range of about 70° F. to 80° F. and a freezing range of about 40° F. to 50° F., so that its freezing range is well above the temperature of the ice cream. The colloidal dispersion is preferably applied at a temperature of about 90° F. although this temperature may range from about 85° F. to 110° F. The colloidal dispersion is preferably applied to the interior of the cone by a spraying operation at the 90° F. temperature and a pressure of about ten pounds per square inch should be used to insure penetration into the surface of the cone. The ice cream is deposited almost instantaneously after the secondary treatment operation. This will cause the fats to immediately congeal and coat the cone, especially the exposed sugar particles thereof, and the solids incorporated therein will aid in filling any interstices in the cone and aid in providing a physical barrier to the rupturing of the secondary coating by penetration of the ice crystals of the ice cream. The secondary treating colloidal dispersion is sprayed on the interior of the cone immediately before contact by the ice cream, as indicated, and this short interval is about one second although it could vary. A preferred range is from about one-half second to five seconds.

Various colloidal dispersions have been used but a colloidal dispersion of chocolate is preferred. The chocolate used has been in the form of ice cream bar coating chocolate. This mixture contains cocoanut oil and solids such as sugar, milk solids, ground cacao bean particles, etc. The fat content of this mixture usually varies from about 58% to 60%, the cocoa solid content from about 8% to 11%, and the balance being sugar and milk solids. The total solids thus generally range from about 40% to 42%. This mixture melts at about 80° F. and freezes at about 50° F. It has been sprayed in the cones at about 90° F. and about one second before the ice cream is dropped therein. At this time the ice cream is about 24° F. It was found that this resulted in the colloidal chocolate disypersion immediately solidifying, with the fats coagulating immediately around the solid particles and forming a continuous film having good mechanical and physical properties so that it not only resists wetting by water but also resists physical penetration. The oil in the chocolate and the oil of the primary coating will have a mutual dissolving action which will cause the chocolate coating to adhere to the cone. The secondary coating colloidal dispersion is such that the liquid fat thereof begins to congeal immediately when the ice cream contacts it and continues to further solidify and get harder. The solid particles improve the psysical and mechanical properties of the melted fat as well as fill any interstices at the surface of the cone.

The filled cones coated in this manner with the secondary coating were placed in a freezer where the temperature was 0° F. or lower. They were stored for twenty-five days. Each day the cones were removed from the freezer into a room having a temperature of around 70° F., and were exposed to room temperature for about fifteen minutes and several times they were permitted to even melt. The cones were later inspected and it was found that there was no penetration of moisture through the secondary coating into the pastry cone. The surface of the cone next to the ice cream remained hard and brittle.

Instead of chocolate, other substances may be used for the secondary coating material. The treating substance may be a colloidal dispersion of solid or liquid fats but preferably the fat is in the form of a vegetable oil. Various vegetable oils such as the preferred cocoanut oil, cottonseed oil, corn oil, soybean oil, cocoa butter, etc. may be used as the liquid. As the solids, the usual solids in chocolate, such as cocoa powder, sugar, milk solids, etc. may be used in combination or separately. Also, starch and similar edible solids may be used. The colloidal dispersion, therefore, is composed generally of edible fats in which edible solids are dispersed. The fats should have a short range of melting and solidifying points, the melting point preferably being around 70° F. and the freezing point around 50° F. The solids need only be edible and of the proper flavor and be of such a nature that they will aid in rapid congealing of the fats and form therewith a barrier film or coating of good physical and mechanical properties. The solids in the mixture should be present as about 40% to 42% of the total.

It will be apparent that this invention provides for the creation of a secondary coating on the interior of the pastry cone or cup-like container which will combine with the primary coating to completely protect the cone from the free water content of the ice cream which fills the cone. The primary coating will function before the secondary coating is applied thereto to protect the cone from water absorption from the air during storage and before it is used.

Although specific reference has been made to pastry cones and ice cream, it is to be understood that any pastry surface can be protected from moisture coming from a contacting frozen confection. For example, pastry wafers for ice cream sandwiches could be similarly protected.

Having thus described my invention, what I claim is:

A method of protecting a baked pastry surface from the water content of a contacting frozen confection which comprises: treating the pastry surface with a primary protective substance which is sprayed thereon at a temperature of about 100° F., said primary substance being a colloidal dispersion of one or more fats and oils having a melting point ranging from about 70° F. to 80° F. and a freezing range of from about 40° F. to 50° F.; subsequently spraying on said treated surface at a temperature ranging from 80° F. to 110° F. a colloidal dispersion containing edible fat having a melting point range of from about 70° F. to 80° F. and a freezing range of from about 40° F. to 50° F. and containing solids in an amount ranging from 40% to 42% by weight; and contacting the said surface within one-half to five seconds after spraying the last-named colloidal dispersion thereon with the confection at a temperature ranging from about 22° F. to 25° F. so as to congeal the fat and form a protective coating on the surface.

References Cited by the Examiner

UNITED STATES PATENTS

| | | | |
|---|---|---|---|
| 1,467,835 | 9/23 | Buhse | 99—89 X |
| 1,615,680 | 1/27 | Buhse | 99—89 |
| 1,708,252 | 4/29 | Berch | 99—88 X |

A. LOUIS MONACELL, *Primary Examiner.*

BEATRICE H. STRIZAK, *Examiner.*